United States Patent [19]
Minkow et al.

[11] Patent Number: 6,106,059
[45] Date of Patent: Aug. 22, 2000

[54] BICYCLE SADDLE WITH CUT OUT

[75] Inventors: Roger Minkow, Petaluma; Lance J. Bohlen, Morgan Hill; Robert F. Egger, Watsonville., all of Calif.

[73] Assignee: Specialized Bicycle Components, Inc., Morgan Hill, Calif.

[21] Appl. No.: 09/452,546

[22] Filed: Dec. 1, 1999

Related U.S. Application Data

[63] Continuation of application No. 09/172,738, Oct. 14, 1998.
[60] Provisional application No. 60/062,979, Oct. 18, 1997.

[51] Int. Cl.$^7$ ........................................................ B62J 1/00
[52] U.S. Cl. ...................... 297/202; 297/214; 297/215.16
[58] Field of Search ................... 297/214, 202, 297/195.1, 452.22, 201, 215.16

[56] References Cited

U.S. PATENT DOCUMENTS

| | | |
|---|---|---|
| D. 282,219 | 1/1986 | Persons . |
| 576,310 | 2/1897 | Henderson . |
| 594,451 | 11/1897 | Wheeler . |
| 630,911 | 8/1899 | Moore ..................................... 297/214 |
| 3,185,522 | 5/1965 | Faulhaber ................................ 297/214 |
| 4,768,826 | 9/1988 | Kashima . |
| 4,898,422 | 2/1990 | West, III ................................. 297/202 |
| 4,952,439 | 8/1990 | Hanson . |
| 5,011,222 | 4/1991 | Yates et al. . |
| 5,074,618 | 12/1991 | Ballard . |
| 5,108,076 | 4/1992 | Chiarella . |
| 5,165,752 | 11/1992 | Terry ...................................... 297/214 |
| 5,286,082 | 2/1994 | Hanson ................................... 297/201 |
| 5,356,205 | 10/1994 | Calvert et al. ..................... 297/452.41 |
| 5,387,024 | 2/1995 | Bigolin .................................. 297/202 |
| 5,645,315 | 7/1997 | Walker, et al. ....................... 297/215.1 |

FOREIGN PATENT DOCUMENTS

| | | |
|---|---|---|
| 0 603 138 | 3/1993 | European Pat. Off. . |
| 94 15 509 | 9/1994 | Germany . |
| WO 88/09738 | 12/1988 | WIPO . |
| WO 98/25810 | 6/1998 | WIPO . |
| WO 98/31584 | 6/1998 | WIPO . |

OTHER PUBLICATIONS

American Bicyclist & Motorcyclist/Nov. 1989, p. 32, "The Hobson".
American Bicyclist & Motorcyclist/Nov. 1988, p. 24 "The Seat".
Bicycle Dealer Showcase/Apr. 1988, p. 26 "The Hobson".
Bicicletta/1992, p. 157 "Selle Bassano".
The Aero Bicycle Saddle, "Aero Saddle," Sep. 18, 1998, http.//www.world–net.net/usersdrwest/, pp. 2 pp. total.
FlatBack Technologies, Inc. "The Cheat–A–Post™," Sep. 18, 1998, http.//www.flatbacktech.com/, pp. 2 pp. Total.
International Search Report, PCT/US98/21989, 6 pages.
Specialized Smart Products Catalog 1999, pp. 90, (Released at Interbike Trade Show in Las Vegas on Sep. 11, 1998).
Savage Bicycle Design L.C., "No Pain . . . No Gain . . .? NOT," pp. 165, Interbike Directory, 1998.
"USA Vuelta Expands Offerings," Bike Pulse Bicycle Product and Industry Trends, Sep. 1998, vol. 2, No., 9 pp. 28–29.

*Primary Examiner*—Anthony D. Barfield
*Attorney, Agent, or Firm*—Knobbe, Martens, Olson & Bear, LLP

[57] ABSTRACT

A bicycle seat with a base having a front which broadens towards a rear that has a notched groove. A connector is attached to the base.

10 Claims, 6 Drawing Sheets

BICYCLE SADDLE WITH CUT OUT

REFERENCE TO RELATED APPLICATION

This application claims the benefit of U.S. Provisional Application No. 60/062,979, filed Oct. 18, 1997.

This application is a Rule 1.53(b) continuation of Ser. No. 09/172,738 filed Oct. 14, 1998.

FIELD OF THE INVENTION

The present invention relates to the field of bicycle seats, and more specifically, to anatomically correct support provided by a seat.

BACKGROUND

Bicycle seats, or saddles, have traditionally been designed with a convex profile such that they fit between the body's ischial tuberosities ("sit bones") with a small protrusion tucked up in the crotch.

Prior bicycle seats cause saddle-related numbness in both male and female riders. This numbness results from pressure on perineal areas which can actually increase as riders sink farther into traditional seats.

In female riders, the arch of the pubic symphysis is shallow. Sitting on traditional bicycle seats can compress tender genital tissues against the seat causing irritation to the genitals.

In male riders, the crotch area of the body contains nerves and pudendal arteries leading to the penis. These arteries carry blood flow that enables erection. Sitting on traditional bicycle seat can increase the pressure in the pudendal arteries causing a decrease in blood flow. This decrease in blood flow may cause numbness potentially leading to impotency in certain male bicycle riders. Therefore, it is desirable to have a seat with a construction that is designed to eliminate these problems.

SUMMARY OF THE INVENTION

The present invention pertains to a bicycle seat with a base having a front which broadens towards a rear having a notched groove. The base includes a rigid frame and a first layer connected to the frame. A connector is attached to the base for connecting the seat to the bicycle.

Another aspect of the present invention includes a second layer of resilient material located between the frame and the first layer that is denser than the first layer material to prevent the rider from bottoming out on the frame.

Yet another aspect of the present invention includes a groove with dimensions approximately equal to the dimensions of a human body ischial tuberosities such that pressure is reduced on the internal pudendal arteries.

Other features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A bicycle seat with cut out is described. The seat is designed to reduce the side effects attributable to seat pressure on the crotch area of a bicycle rider. The seat reduces pressure on the internal pudendal arteries and prevents decreased blood flow that may cause numbness and impotency in some male riders.

Figure 1:
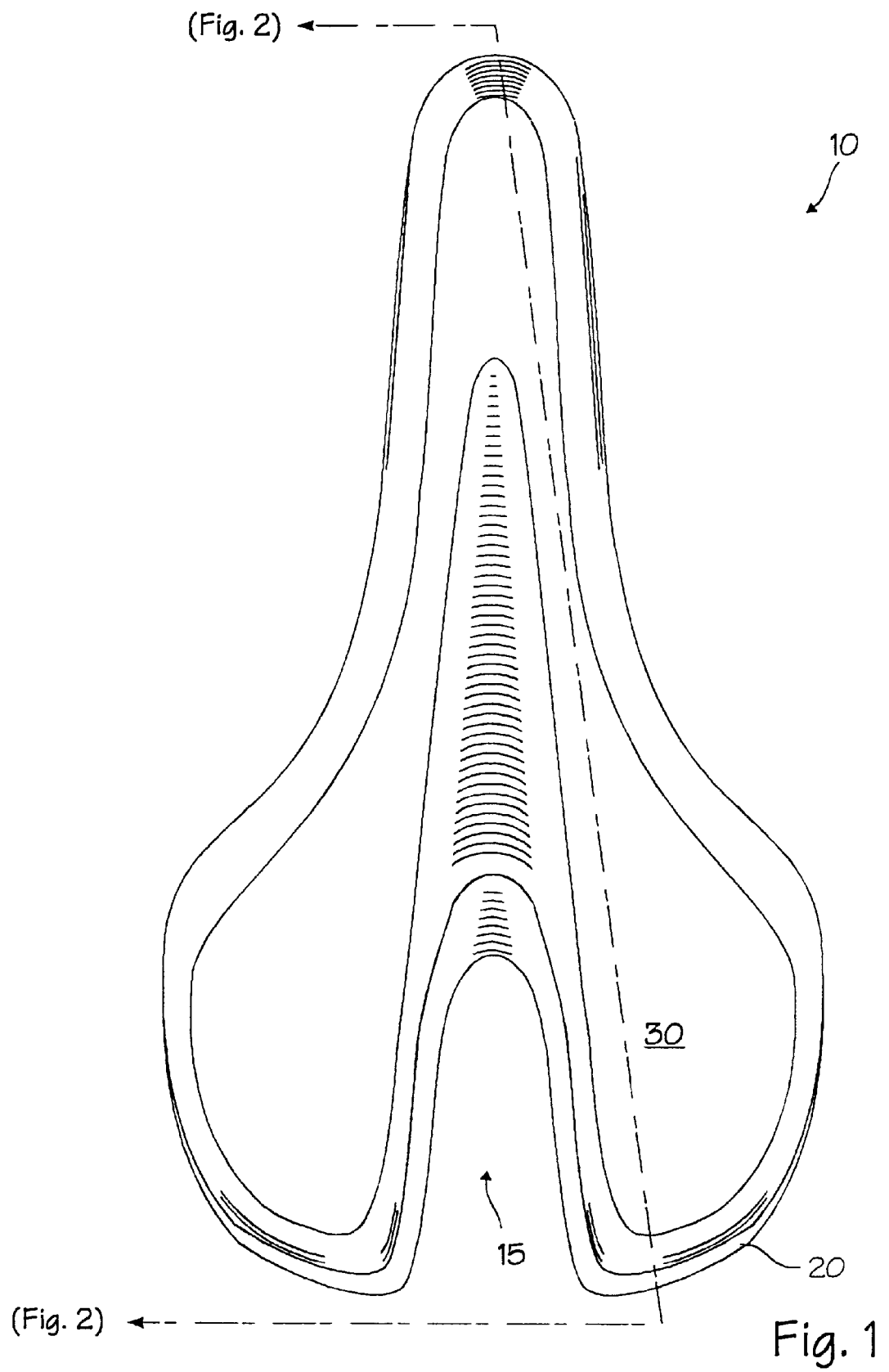
FIG. 1 shows a top perspective of a bicycle seat having a groove cut out of the rear of the seat.

FIG. 1 shows a top perspective of one embodiment of the bicycle seat having a triangular groove, or notch, 15 cut out of the rear of seat 10. The seat has a resilient material layer 30 on top of a frame 20. The configuration of groove 15 is designed to match the anatomy of the ischial tuberosities of the pelvis in an anatomically correct way to relieve pressure on the pudendal arteries. For one embodiment of the seat the interior of groove 15 is notched and beveled. A notch is defined as a V-shaped cut that begins at the rear of the seat and narrows as it extends towards the front of seat 10. Beveled is defined as an angle formed by the top surface of the seat and the interior surface of the groove that is less than 90 degrees. For example, groove 15 measures approximately 2¼" wide at its rear, extends up to 10" into seat 10, and is beveled at approximately a 60 degree angle. These dimensions can be varied to accommodate different sized pelvic structures and intended uses. In another embodiment, groove opening 15 is bridged such that a rigid material spans and connects one side of groove opening 15 to the other side.

In other embodiments, the opening of groove 15 can be in the form of a different shape such as a rectangle, ellipse, or hyperbola.

Figure 2:
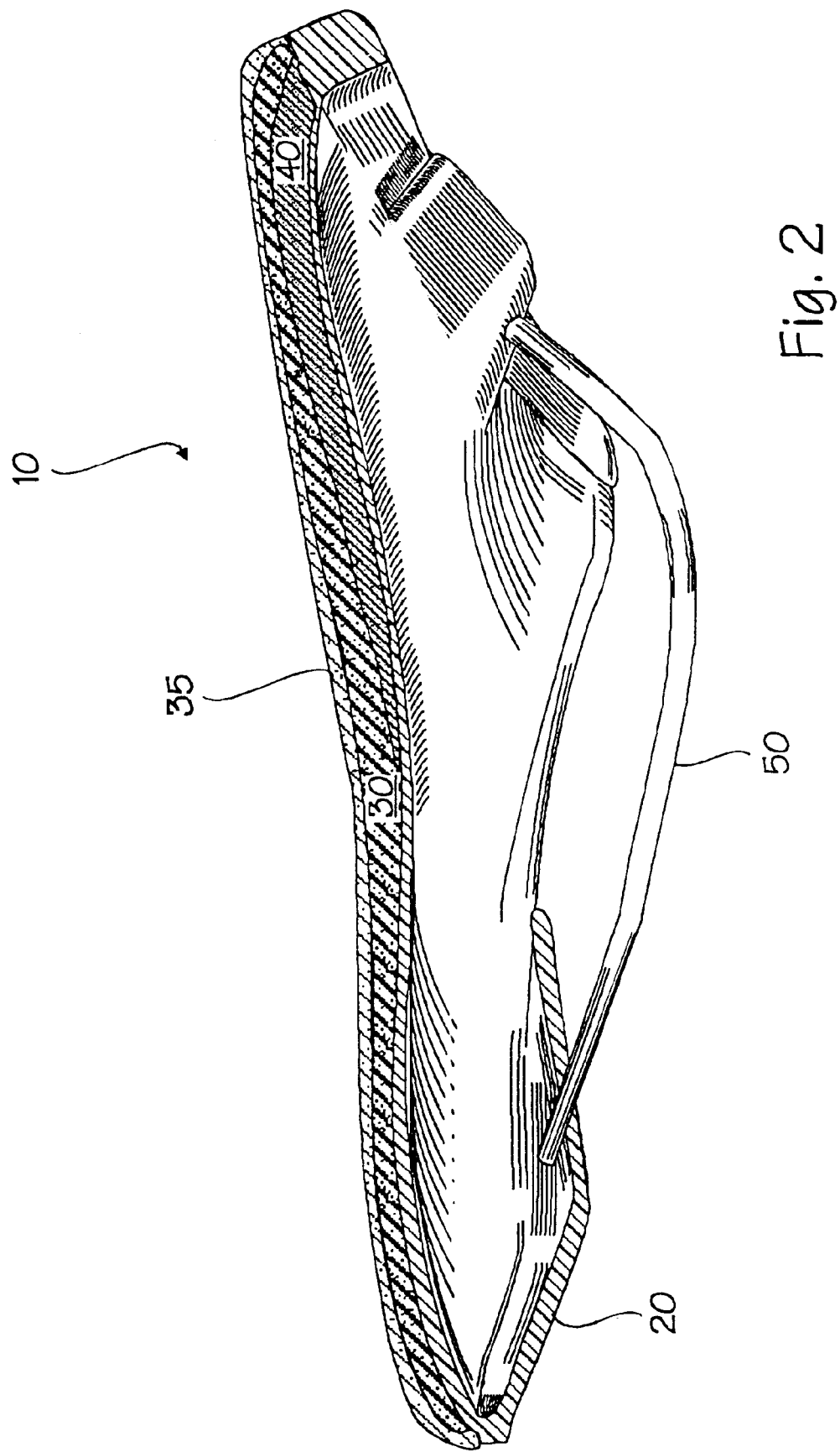
FIG. 2 shows a cross-section of a bicycle seat that implements one embodiment of the present invention.

FIG. 2 shows a cross-section of one embodiment of seat 10. Frame 20 is constructed from plastic or another rigid material such as titanium or aluminum. A connecting bar 50 is attached to the underside of frame 20 to attach seat 10 to a bicycle seat post (not shown). Resilient layer 30 is on top of frame 20. As is known to those skilled in the art, layer 30 can be constructed from many resilient or elastic materials such as a polyurethane foam or gel.

In another embodiment, another resilient material layer 40 is between frame 20 and layer 30. Layer 40 is bonded to layer 30. Layer 40 consists of a high resiliency polyurethane foam. The foam has a durometer reading in the range of 40–50 durometer units. In other embodiments, layers 30 and 40 can be constructed from other resilient or elastic materials that are well known to those skilled in the art.

In another embodiment, layer 40 is constructed from a material that is denser than layer 30 to prevent the rider from bottoming out on frame 20. Bottoming out is a condition that occurs when the layers have fully compressed under weight. This results in the rider in effect sitting on the frame, not supported by the layers.

An alternative embodiment of seat 10 contains only layer 30 over frame 20. Yet another embodiment of seat 10 contains only layer 40 over frame 20.

The typical thickness of layers 30 and 40 can vary from approximately 1/16" to 1". An outer layer 35 is used to cover layers 30 and 40 and attaches to frame 20. Outer layer 35 is a synthetic material. For other embodiments, outer layer 35 may be constructed from other materials such as leather or fabric.

Figure 3:
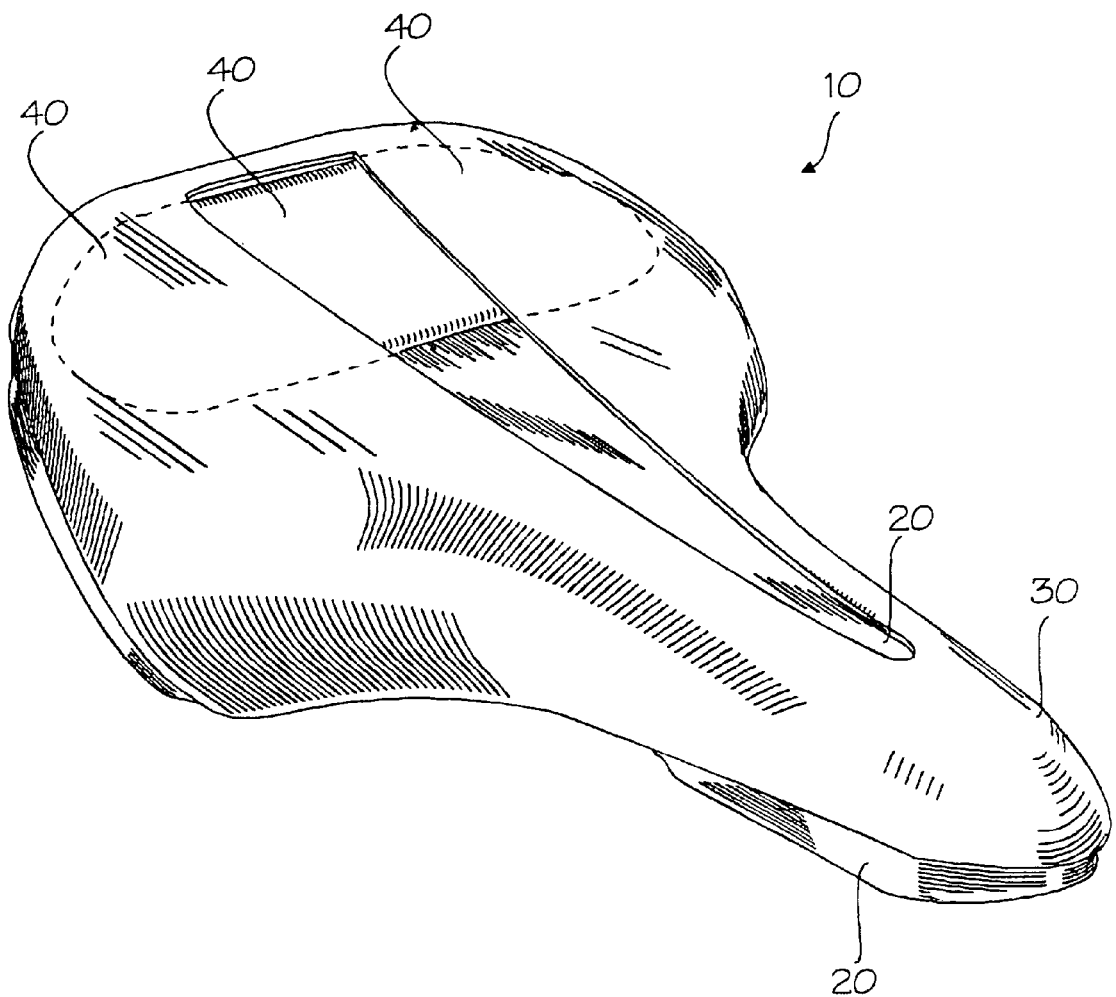
FIG. 3 shows an alternate embodiment of the seat having a cavity cut out of a foam layer.

FIG. 3 shows an alternate embodiment of seat 10 having a triangular cavity cut out of layer 30. In other embodiments, the cavity can be different shapes such as a rectangle, ellipse, or hyperbola. The cavity can also be cut out of either, or both, layers 30, 40 and frame 20. In other embodiments the cavity is also cut out of the rear of seat 10 forming a groove as described above.

Figure 4:
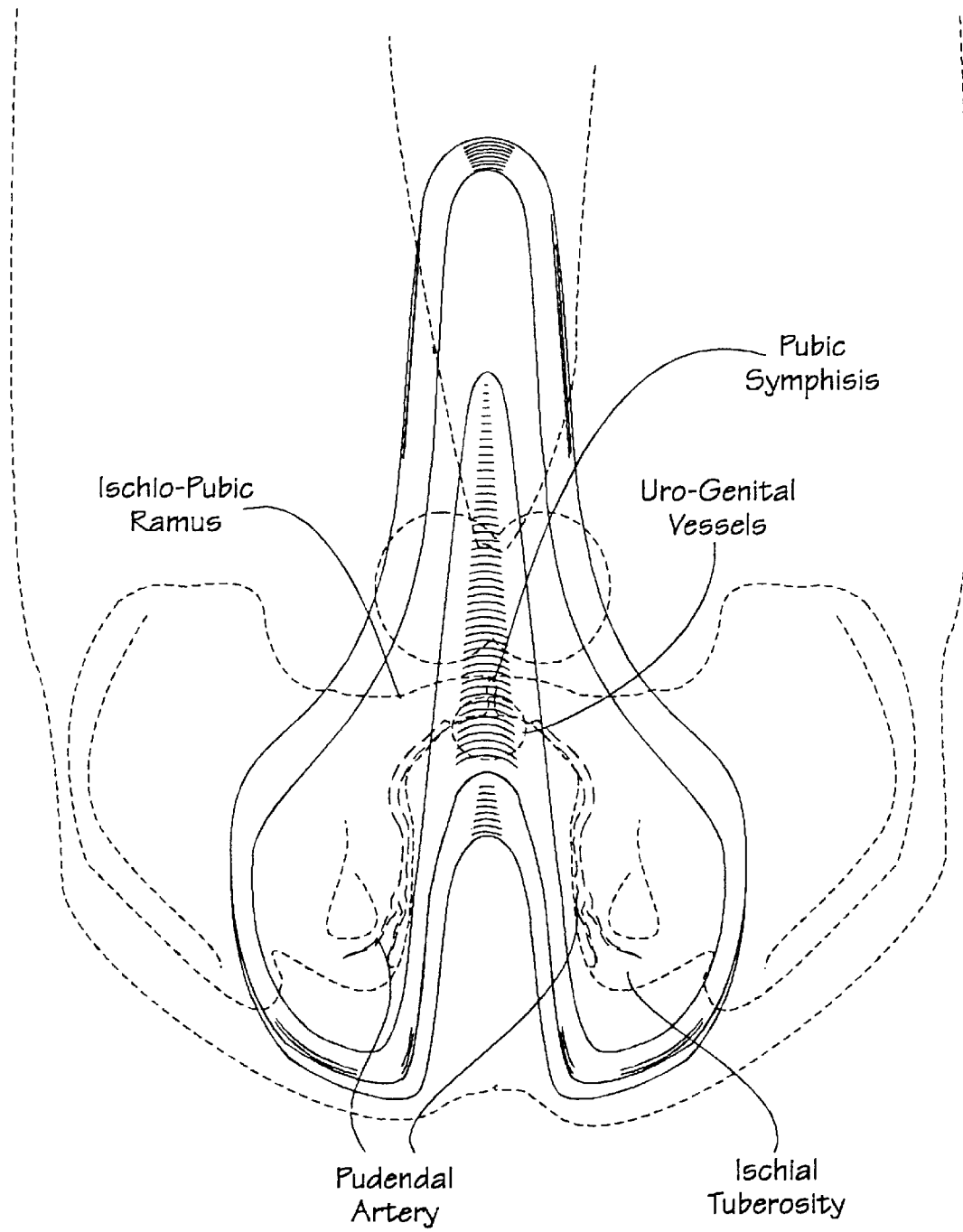
FIG. 4 shows a top view of the ischial tuberosities in relation to one embodiment of the seat cut out.
Figure 5:
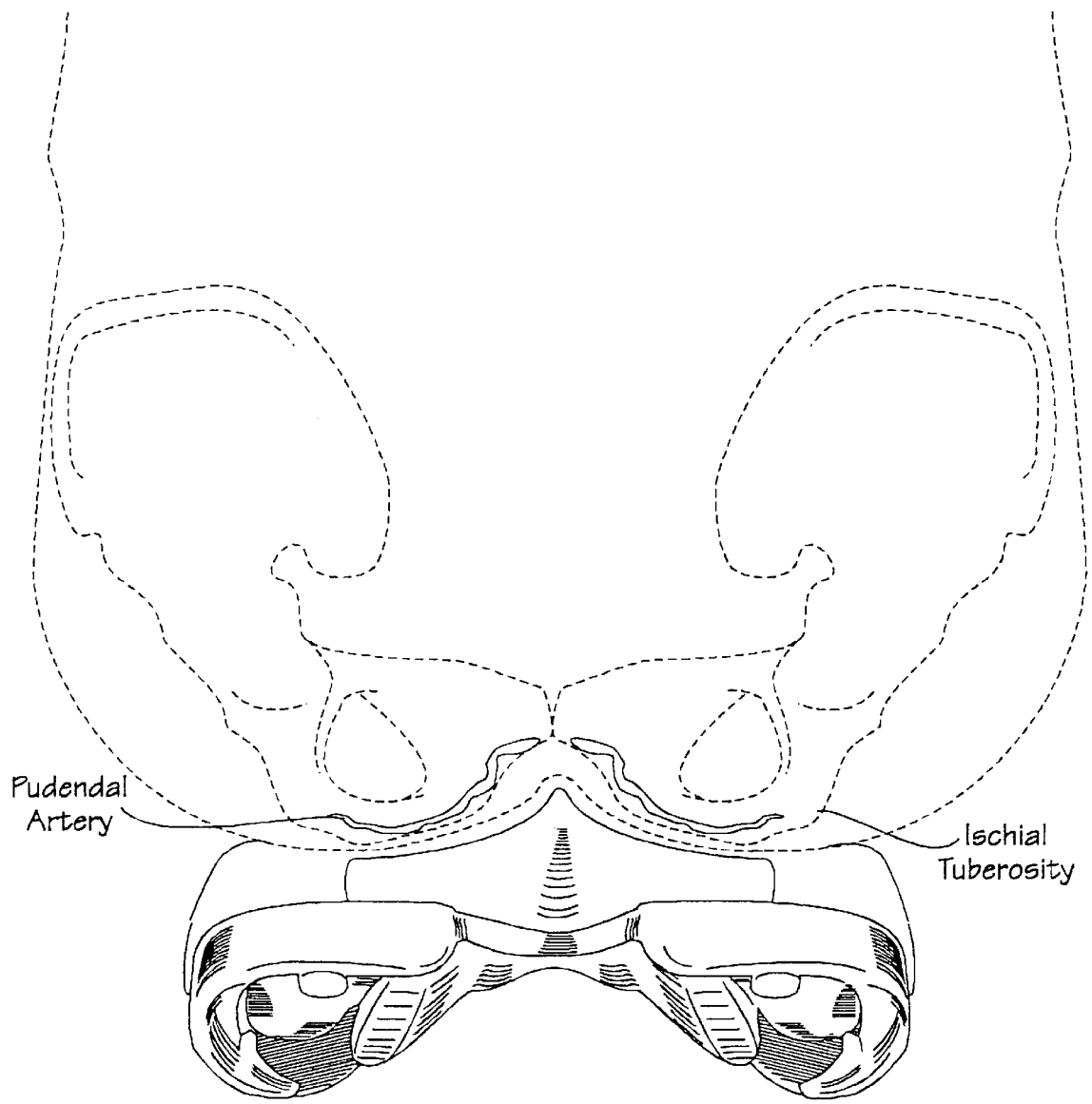
FIG. 5 shows a cross section of the ischial tuberosities in relation to a rear view of one embodiment of the seat cut out.

The configuration of the cut out is designed to match the anatomy of the ischial tuberosities of the pelvis in an anatomically correct way to relieve pressure from the pudendal arteries. The distance between the ischial tuberosities of an adult varies between approximately 2" to 4½". The cut out is large enough so that there is space underneath the pelvis between the ischial tuberosities along the length of the pudendal arteries. In another embodiment, the top surface of seat 10 is approximately flat. FIG. 4 shows a top view of the ischial tuberosities in relation to one embodiment of the cut out. FIG. 5 shows a cross sectional view of the ischial tuberosities in relation to a rear view of one embodiment of the cut out.

Figure 6:
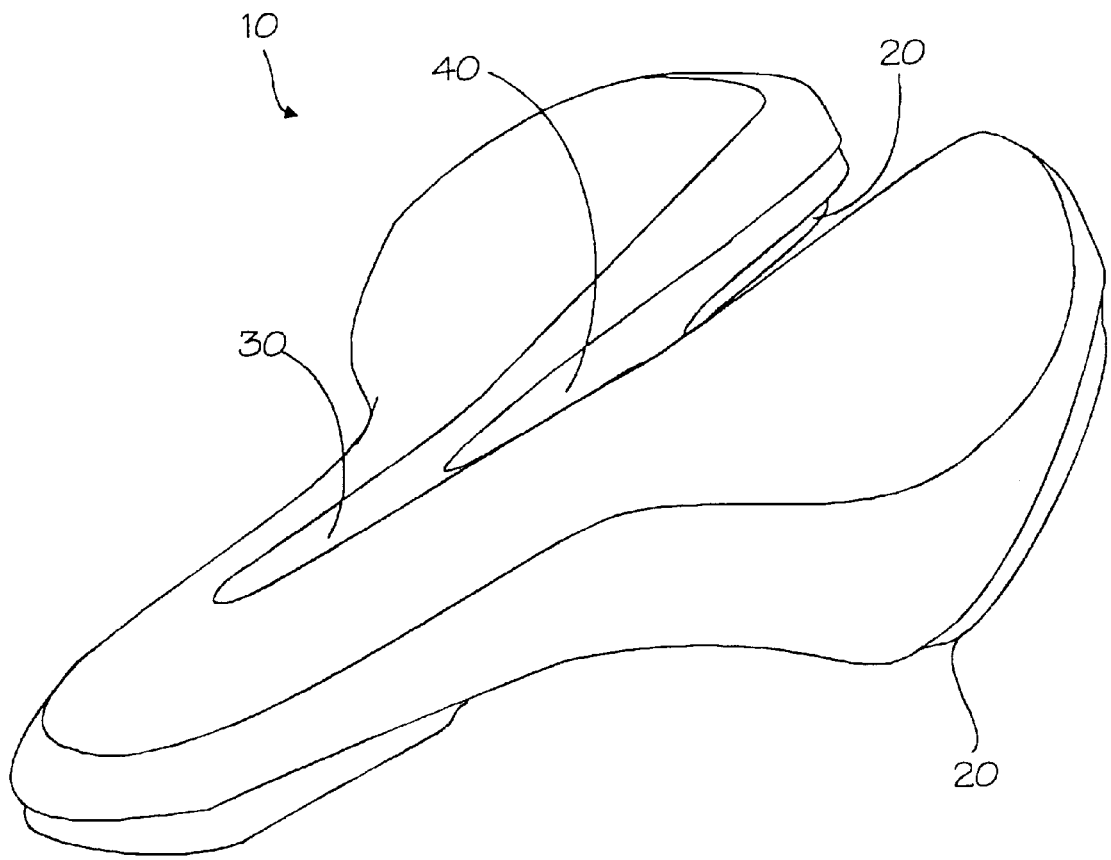
FIG. 6 shows an alternate embodiment of the seat having a beveled groove.

FIG. 6 shows an alternate embodiment of seat 10 where the groove in layers 30 and 40 extends forward further than the groove in frame 20. The groove is notched with each layer beveled to a greater extent than the layer beneath it such that layer 40 extends farther forward than frame 20 and layer 30 extents farther forward than layer 40. This configuration allows for space for the scrotum while providing uniform support of the user through the entire range of foam layer compression. As the beveled layers 30 and 40 compress, the user's body comes in surface contact with more of the seat thereby increasing the support to the user.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An ergonomic bicycle seat, comprising:
   a one-piece rigid base defining a front, a back, a first outer side and a second outer side, said base generally widening from front to back, said base defining a length and a V-shaped cutout having a leading edge extending from said back to approximately the middle of said base;
   a resilient material secured to said base, said resilient material defining an upper surface;
   a central V-shaped groove at least partially defined by inwardly facing sides of said resilient material which are beveled outward toward said upper surface, said groove extending to form a scrotum channel positioned roughly in the longitudinal center of said seat, said groove having a leading edge defined by said resilient material, said leading edge of said groove extending forward of said leading edge of said cutout, said groove extending rearward to approximately said back of said base,
   wherein said groove has a width of approximately 2¼ inches at said upper surface at said back of said base and narrows as said groove extends toward said scrotum channel, and wherein further said groove and said cutout cooperate to define an open space for relieving pressure on the pudendal arteries.

2. The ergonomic bicycle seat of claim 1, wherein said seat has a top surface which is substantially flat.

3. The ergonomic bicycle seat of claim 2, further comprising an outer cover over said resilient material and wherein said resilient material comprises a first layer and a second layer, said second layer positioned between said base and said first layer and being denser than said first layer.

4. The ergonomic bicycle seat of claim 3, wherein at least a portion of said groove extends through said first layer and said second layer.

5. The ergonomic bicycle seat of claim 1, further comprising an outer cover over said resilient material and wherein said resilient material comprises a first layer and a second layer, said second layer positioned between said base and said first layer and being denser than said first layer, said second layer comprising foam.

6. An ergonomic bicycle seat, comprising:
   a one-piece rigid base defining a front, a back, a first outer side and a second outer side, said base generally widening from front to back, said base defining a length and a V-shaped cutout having a leading edge extending from said back to approximately the middle of said base;
   a resilient material secured to said base, said resilient material defining an upper surface;
   a central V-shaped groove at least partially defined by inwardly facing sides of said resilient material which are beveled outward toward said upper surface, said groove extending to form a scrotum channel positioned roughly in the longitudinal center of said seat, said groove having a leading edge defined by said resilient material, said leading edge of said groove extending forward of said leading edge of said cutout, said groove extending rearward to approximately said back of said base,
   wherein said groove has a width of between approximately 2 inches and approximately 4½ inches at said upper surface at said back of said base and narrows as said groove extends toward said scrotum channel, and wherein further said groove and said cutout cooperate to define an open space for relieving pressure on the pudendal arteries.

7. The ergonomic bicycle seat of claim 6, wherein said seat has a top surface which is substantially flat.

8. The ergonomic bicycle seat of claim 7, further comprising an outer cover over said resilient material and wherein said resilient material comprises a first layer and a second layer, said second layer positioned between said base and said first layer and being denser than said first layer.

9. The ergonomic bicycle seat of claim 8, wherein at least a portion of said groove extends through said first layer and said second layer.

10. The ergonomic bicycle seat of claim 6, further comprising an outer cover over said resilient material and wherein said resilient material comprises a first layer and a second layer, said second layer positioned between said base and said first layer and being denser than said first layer, said second layer comprising foam.

* * * * *